United States Patent [19]

Moriyama

[11] Patent Number: 4,474,475

[45] Date of Patent: Oct. 2, 1984

[54] MIXING APPARATUS

[76] Inventor: Masao Moriyama, No. 508-13, Tendocho 17, Nishinomiyashi, Hyogo, Japan

[21] Appl. No.: 565,011

[22] Filed: Dec. 22, 1983

[30] Foreign Application Priority Data

Dec. 30, 1982 [JP] Japan .................................. 57-231243
Dec. 30, 1982 [JP] Japan .................................. 57-231244
Feb. 12, 1983 [JP] Japan .................................. 58-21924

[51] Int. Cl.³ .............................................. B29B 1/10
[52] U.S. Cl. ....................................... 366/85; 366/90; 366/97; 366/298; 366/300; 366/301; 425/208
[58] Field of Search .................. 366/85, 84, 83, 88, 366/90, 97, 300, 301, 298, 100, 70, 71; 425/201, 208, 207, 209

[56] References Cited

U.S. PATENT DOCUMENTS 3,403,894 10/1968 Matsuoka ............................... 366/97
3,873,070 3/1975 Beken ................................... 366/300
3,900,187 8/1975 Loomans ............................... 366/85
4,040,607 8/1977 Ullrich .................................. 366/85

Primary Examiner—Robert W. Jenkins
Attorney, Agent, or Firm—Koda and Androlia

[57] ABSTRACT

A mixing apparatus for blending one or more relatively viscous liquids into a homogeneous mixture, the apparatus including a fixed vessel, a pair of rotors rotatively housed in the vessel, each rotor rotating on its own rotary shaft, the rotary shafts being rotated in opposing directions, the rotors having helical mixing vanes thereon wound oppositely in directions and differently in number, wherein the outside diameters $D_1$, $D_2$ of the rotors, the distance A between the rotary shafts, the rotating angular velocities of the rotors, and the number of the helical vanes are defined by the numerical criterion: A is smaller than $\frac{1}{2}(D_1+D_2)$, and the ratio between velocities of the rotors is equal to the inverse number of the ratio between the numbers of the helical mixing vanes.

6 Claims, 12 Drawing Figures

MIXING APPARATUS

BACKGROUND OF THE INVENTION

The present invention relates to a mixing apparatus for use in blending two or more viscous liquids, such as rubber or plastic, and more particularly, to a mixing apparatus for such use, the apparatus having two rotors rotating on two rotary shafts, commonly called a two-axes type kneader. More specifically, the present invention relates to a mixing apparatus of two-axes type, wherein the two axes rotate in opposing directions.

The two-axes type kneader is well known and widely used, and the known kneader has a relatively long distance between the two rotary shafts to the extent that the distance is larger than the outside diameter of each rotor. Alternatively, when it is smaller than the diameter of the rotor, thereby allowing the two circulating paths to overlap in part, the angular and peripheral velocities of the two rotors are designed to be equal. In the former case, the mixing takes place mainly between the rotors and the inside walls of the vessel, but this system disadvantageously produces a relatively large space between the rotors. This space makes no substantial contribution to the mixing operation. In the latter case it can be thought that the larger the overlapping portions of the circulating paths are, the more these portions contribute to the mixing operation. However, it is required that the two rotors rotate at the same peripheral velocity. In addition, the materials to be mixed are introduced and withdrwn at the constantly same velocity, whereby no compressive force and/or no shearing force act on the materials being mixed. For these reasons it is difficult to enhance the mixing efficiency under the conventional mixing apparatus.

OBJECTS AND SUMMARY OF THE INVENTION

The present invention aims at overcoming the problems pointed out with respect to the conventional two-axes type kneader, and has for its object to provide an improved two-axes mixing apparatus capable of mixing viscous liquids with efficiency and in a short time in an unprecedented manner.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a mixing apparatus comprising:
- a fixed vessel;
- a pair of rotors rotatively housed in said vessel, each of the rotors rotating on its own rotary shaft in opposite direction to that of the paired rotor;
- said rotors having helical mixing vanes thereon wound oppositely in winding directions and differently in numbers;
- wherein the outside diameters $D_1$, $D_2$ of said rotors, the distance A between said two rotary shafts, the rotating angular velocities of said rotors, and said numbers of the helical mixing vanes are defined by the following numerical criterion: A is smaller than $\frac{1}{2}(D_1+D_2)$, and the ratios between the angular velocities of the rotors is equal to the inverse number of the ratio between said number of the helical mixing vanes.

DETAILED DESCRIPTION OF THE INVENTION

The present invention can be embodied into at least two types; one is that the vessel is made a relatively long cylindrical shape with a material inlet port and a mixture outlet port, in which the materials are continuously mixed during flowing through the vessel. The other type is commonly called a batch type, which has a short boxed-shaped vessel with a single opening for inlet and outlet at the top thereof. The materials are introduced through the opening, and the mixture is withdrawn from the same opening.

Figure 1:
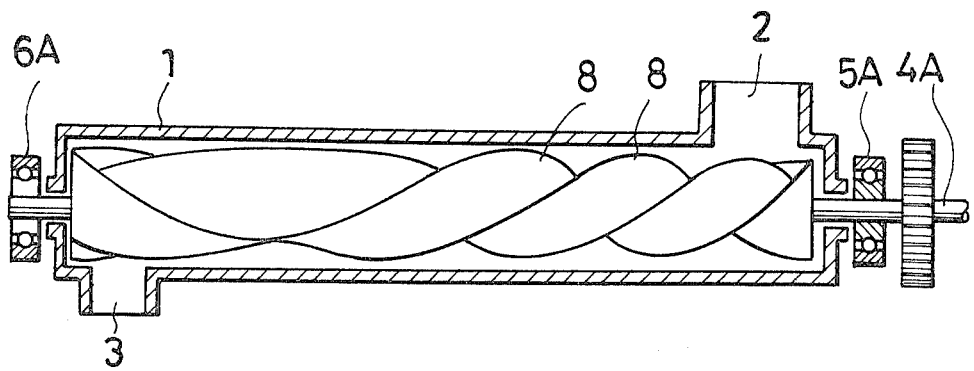
FIG. 1 is a cross-sectional front view showing a mixing apparatus embodying the present invention.
Figure 2:
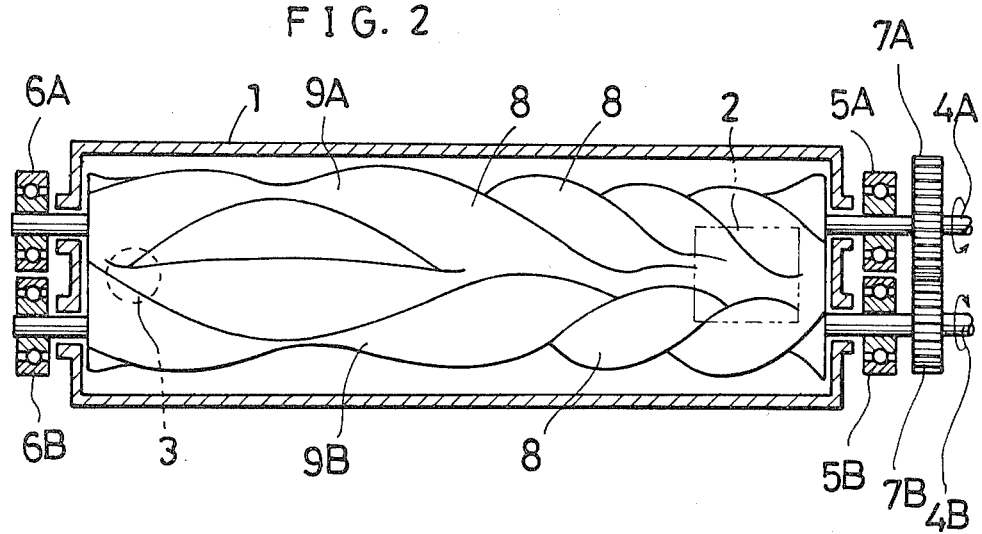
FIG. 2 is a cross-sectional plan view showing the apparatus of FIG. 1.
Figure 3:
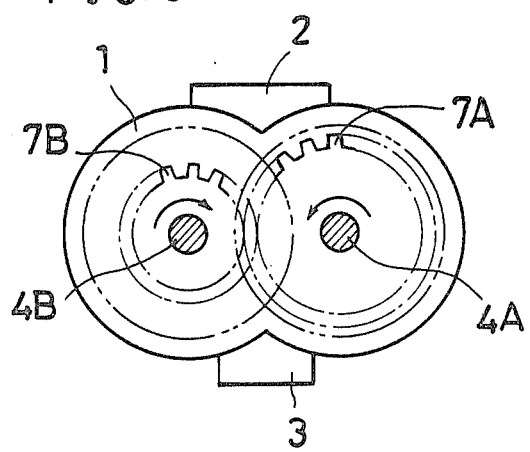
FIG. 3 is a side view of the apparatus of FIG. 1.

In the following description the first-mentioned example relates to the former type, and the secondly-mentioned example relates to the latter type:

Referring to FIGS. 1 to 3, a vessel 1 has a twinned-cylindrical body, and is provided with a material inlet 2 at one end thereof and a mixture outlet 3 at the other end thereof. Two rotary shafts 4A, 4B are carried in parallel on bearings 5A and 6A, 5B and 6B, respectively. The rotary shafts are rotated in opposing directions by an electric motor through the meshing of gears 7A and 7B secured to each shaft.

Figure 4:
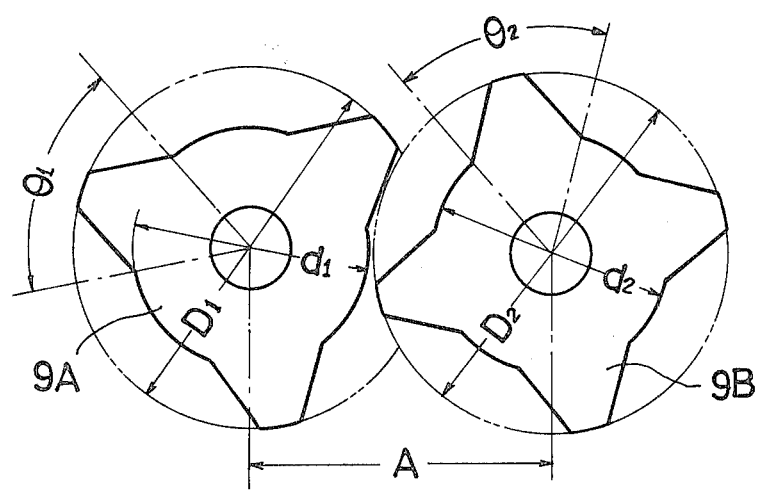
FIG. 4 is a diagrammatic view of the cross-section of the rotors used in the apparatus of FIG. 1.

Each rotary shaft has helical threads, which are intended to function as mixing vanes, hereinafter referred to as helical vanes 8. The helical vanes 8 on each rotary shaft turn about its axis in the opposite direction to that of the paired vanes. In addition, the number of the helical vanes 8 is different from each other; in the illustrated embodiment, the rotary shaft 4A (the rotor 9A) has 3 vanes, and the rotary shaft 4B (the rotor 9B) has 4 vanes. When the two rotors are rotated, the opposing helical vanes 8 come into engagement with each other. As described above, the rotors rotate in the opposing directions, thereby forcing the liquids into gaps between the helical vanes 8 in mesh. The liquids to be mixed are subjected to a strong pressure therein, and are "crashed" sufficiently to admix with each other. In FIG. 4, let the outside diameters of the rotors 9A, 9B be $D_1$, $D_2$, and the distance beween the axes of the rotary shafts 4A, 4B be A. The relationship therebetween is expressed by:

A is smaller than $\frac{1}{2}(D_1+D_2)$

This means that the circulating paths of the two rotors overlap in part as clearly shown in FIG. 4. Let the root diameters of the rotary shafts 4A, 4B be $d_1$, $d_2$, the following relationships are expressed by:

$\frac{1}{2}(d_1+D_2)$ is smaller than A and $\frac{1}{2}(D_1+d_2)$ is smaller than A It is evident from these formulae that the crests of the helical vanes on one rotor come closest to the roots of the paired helical vanes on the other rotor on the central line passing through the axes of the two rotors. When each rotary shaft is cut away in a plane perpendicular to its rotating axis, the cut-away face has the same shape as shown in FIG. 4, wherever it may be cut along its length or whatever the angle of axial advance of the helical vanes may be set.

A preferable relationship between $d_1$, $d_2$, $D_1$, $D_2$ can be expressed in the following equations:

$d_1 = (0.5 \text{ to } 0.7) \times D_1$ $d_2 = (0.5 \text{ to } 0.7) \times D_2$ The optimum values of $d_1$ and $d_2$ are within the range obtained by the above equations.

In FIG. 4, the crest of each vane has two starting points, which, however, are actually axial lines. Now, let the angle formed by the two starting points at the center of each rotary shaft be $\theta_1$, $\theta_2$, the following relationship is established:

$\theta_1 \approx \theta_2$: Wherein the values of $\theta_1$, $\theta_2$ preferably fall within the range of 50° to 60°.

This relationship is constant regardless of the numbers of the helical vanes 8.

The angle of the axial advance of the helical vanes 8 can be changed gradually or abruptly; in the illustrated embodiment, the angle of advance in the region near the inlet 2 is made relatively small so as to provide a supply path whereby the materials are allowed to advance gradually, and the winding directions are reversed in the midway or a slightly further depth, wherein the angles of advance are made relatively large, thereby providing a mixing section in this region.

Figure 10A:
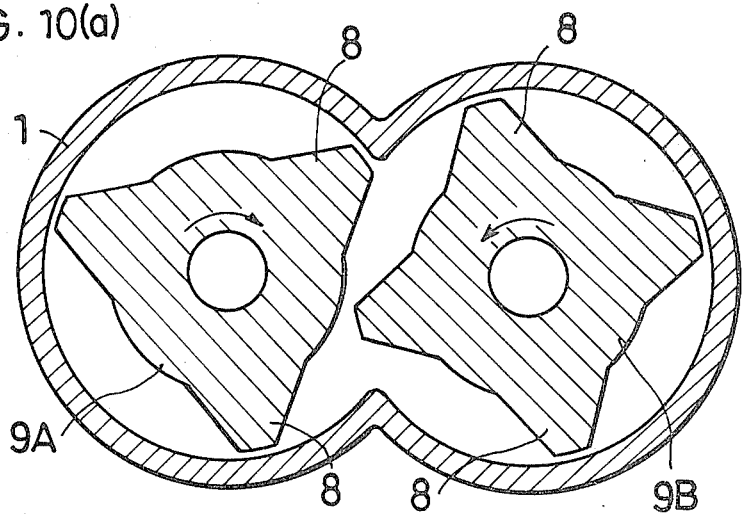
FIGS. 10 (a), (b) and (c) are views exemplifying the actions of the rotors shown in FIG. 1.
Figure 10B:
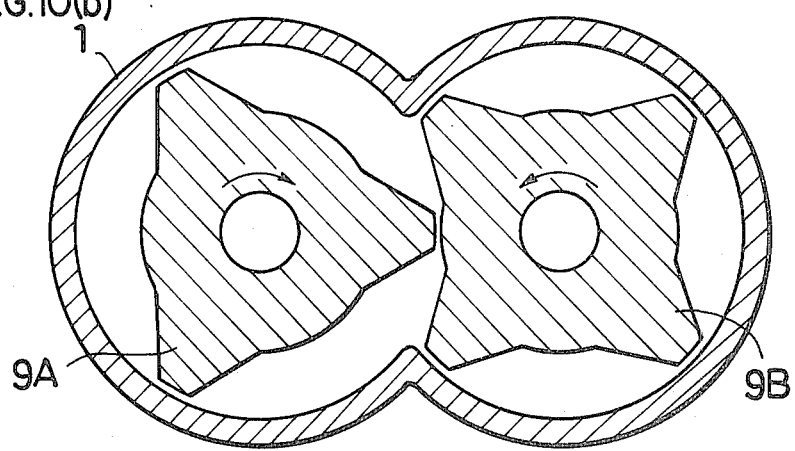
Figure 10C:
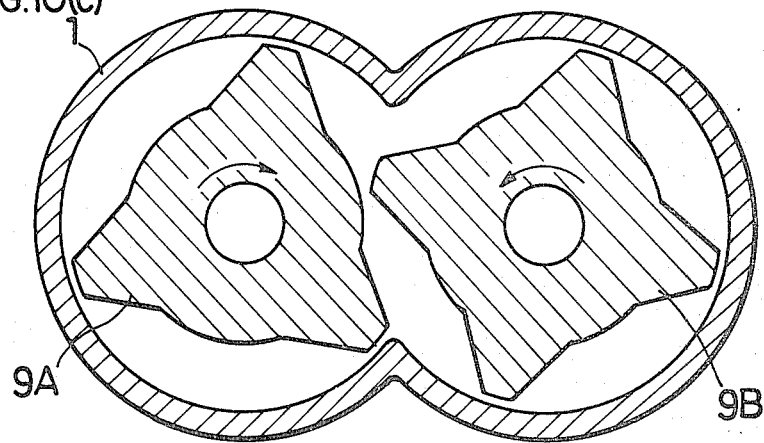

The gear ratio between the gears 7A and 7B is equal to the inverse number of the ratio between the numbers of the helical vanes 8 on the rotary shafts 4A and 4B; in the illustrated embodiment the gear ratio is 4:3. As a result, the ratio of the angular valocities between the rotary shafts becomes equal to the inverse number of the ratio of the numbers of helical vanes. This means that while the rotor having 4 helical vanes rotates a quarter of the turn, the other rotor having 3 helical vanes rotates one-third of the turn. FIG. 10 shows the mode of the motions of the two rotors.

Figure 5:
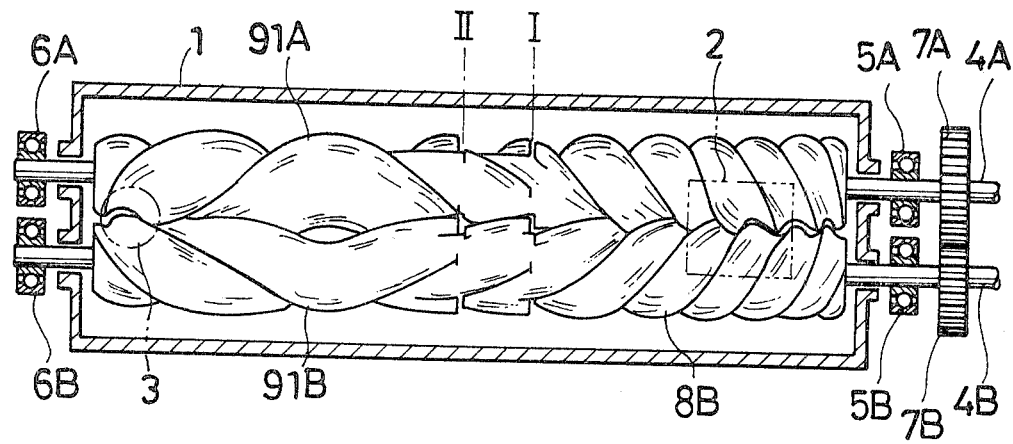
FIG. 5 is a cross-sectional plan view showing an alternative embodiment of the present invention.
Figure 6:
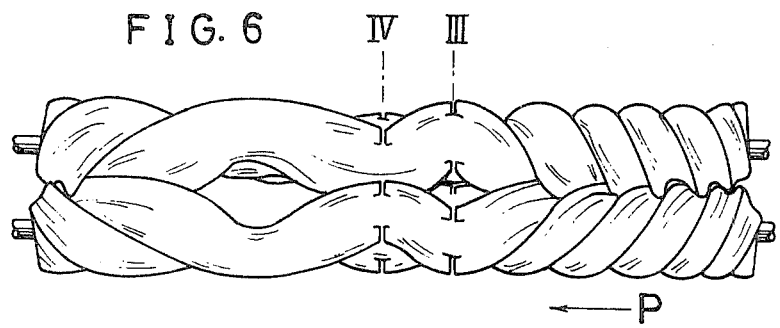
FIG. 6 is a plan view showing a modified version of the rotor shown in FIG. 5.
Figure 7:
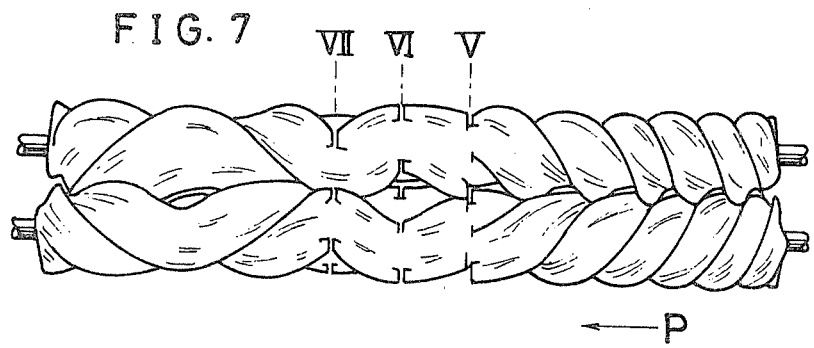
FIG. 7 is a plan view showing another modified version of the rotor shown in FIG. 5.

Referring to FIGS. 5 to 7, a slightly modified version of the above-mentioned embodiment will be described:

The rotary shafts 9A, 9B have helical vanes which are changed in their phases and angles of axial advance at one or more places along the length thereof. These changes are disconnectedly or abruptly made. The embodiment shown in FIG. 5 has phasic disconnections at two places I and II where all the helical vanes on the rotors 9A, 9B are made to advance or be delayed at the same angle.

By virtue of the phasic discontinuity the liquids to be mixed are disturbed or agitated in this region, thereby enhancing the mixing efficiency.

In FIG. 6 the angles of advance of the helical vanes are disconnectedly changed at the places III and IV. More concretely, they are divided into two different phases, that is, one is in the positive direction, and the other is in the negative direction. As a result, the liquids advancing in the direction P are liable to a resisting force to their movement in the counter-P direction, thereby urging the liquids to return in the opposite direction. In this way a turbulence is caused in the liquid flows in this region III to IV, which increases the mixing efficiency.

In FIG. 7 the helical vanes 8 are phasically disconnected at the point V, and the angles of advance are disconnected at the points VI and VII. The number of the phasic discontinuity, and the combination of the phasic discontinuity and the variations of the angle of advance of the helical vanes are optionally determined. At the point of discontinuity it is preferred that to avoid the overlapping or conflicting of the vanes a ring-shaped recess is provided therebetween.

Figure 8:
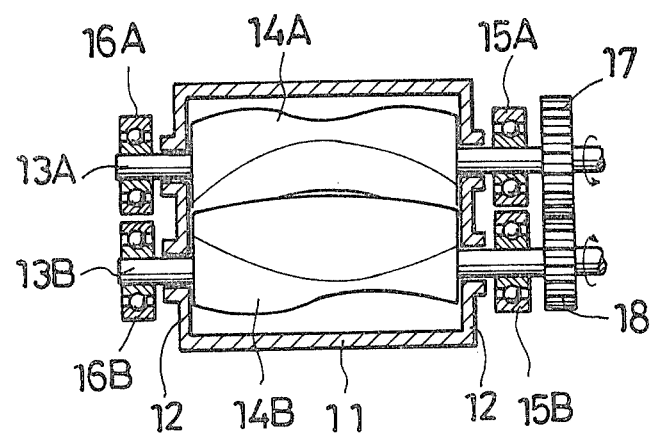
FIG. 8 is a cross-sectional plan view showing a further alternative embodiment of the present invention.
Figure 9:
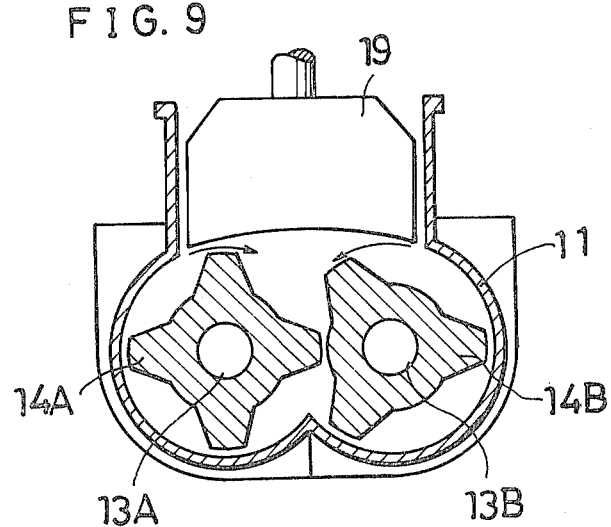
FIG. 9 is a cross-sectional side view of the apparatus of FIG. 8.

FIGS. 8 and 9 show a batch type mentioned above, characterized in that the vessel has the only one opening, which functions as an outlet as well as an inlet. The details are as follows:

The illustrated mixing apparatus, commonly called a dispersion kneader, has a box-shaped vessel 11 with an opening covered by a pressure lid 19 at its top. The vessel 11 has a pair of rotary shafts 13A, 13B passed through its opposing side walls 12. The reference numerals 15A, 16A, 15B and 16B designate bearings for supporting the rotary shafts 13A, 13B. The rotary shafts 13A and 13B are coupled to gears 17 and 18, respectively, whereby the rotary shafts are rotated in opposite directions. The liquids are mixed under a pressure, for which the pressure lid 19 is employed. A rotor 14A is mounted on the rotary shaft 13A, which rotor has 4 helical vanes. A rotor 14B is mounted on the rotary shaft 13B, which rotor has 3 helical vanes. The angle of advance of the helical vanes is changed in the same manner as described above. The gear ratio between the gears 17 and 18 is equal to the inverse number of the ratio of the numbers of the helical vanes between the rotors 14A, 14B.

In the foregoing description the ratio of the number of the helical vanes is 3:4, but the ratios are not limited to it, but of course 2:3, 2:4 and 3:5 can be selected.

As evident from the foregoing description, the mixing efficiency is enhanced because of the different peripheral velocities of the rotors, which would be unobtainable under the conventional mixing apparatus in which the peripheral velocities of the rotors are the same. The high mixing efficiency advantageously shortens the operation time for the same quantity of liquids, as compared with the known apparatus. This is particularly advantageous in the type of mixing apparatus in which liquids are mixed while flowing through the vessel, because the liquids must be mixed in the limited period of time.

According to the present invention, the distance A between the axes of the rotors is made smaller than $\frac{1}{2}(D_1+D_2)$, and the rotating paths of the two rotors are allowed to overlap in part. This is effective to enable the opposing crests and roots of the helical vanes to be close to each other on the central line passing through both the rotating axes. In addition, two spaces are produced upwards and downwards of the central line, wherein the two spaces are divided at the point where the crest and the root of the vanes are nearest, as clearly shown in FIG. 10 (b). These spaces are alternately enlarged and restricted in accordance with the motion of the rotors rotating at different velocities. Because of an extremely narrow path existing between the two spaces the liquids to be mixed repeatedly undergo a compressive force and a shearing force, which ensures that the liquids are well mixed into a homogeneous liquid.

What is claimed is:

1. A mixing apparatus for blending one or more relatively viscous liquids into a homogeneous mixture, the apparatus comprising:
    a fixed vessel;
    a pair of rotors rotatively housed in said vessel, each of the rotors rotating on its own rotary shaft in the opposite direction to that of the paired rotor;
    said rotors having helical mixing vanes thereon wound oppositely in winding directions and differently in numbers;
    wherein the outside diameters $D_1$, $D_2$ of said rotors, the distance A between said two rotary shafts, the rotating angular velocities of said rotors, and said numbers of the helical mixing vanes are defined by the following numerical criterion: A is smaller than $\frac{1}{2}(D_1+D_2)$, and the ratio between the angular velocities of the rotors is equal to the inverse number of the ratio between said numbers of the helical mixing vanes.

2. A mixing apparatus as defined in claim 1, wherein the vessel has a twinned-cylindrical shape, and is provided with a material inlet at one end thereof and a mixture outlet at the other end thereof, thereby allowing the materials to be mixed while flowing from the inlet to the outlet.

3. A mixing apparatus as defined in claim 1, wherein the vessel has a relatively short box shape with an opening at the top thereof, the rotors being mounted on rotary shafts carried on opposing side walls.

4. A mixing apparatus as defined in claim 1, wherein one of the rotor has 3 helical mixing vanes, and the other rotor has 4 helical mixing vanes.

5. A mixing apparatus as defined in claim 1, wherein the rotors each have at least one point at which the phase of the helical vanes and/or the angle of advance thereof are/is disconnectedly changed.

6. A mixing apparatus as defined in claim 1, wherein the rotors are driven by power through the meshing of gears, the gear ratio being equal to the inverse number of the ratio of the number of the helical vanes between the rotors.

* * * * *